Figure 1:
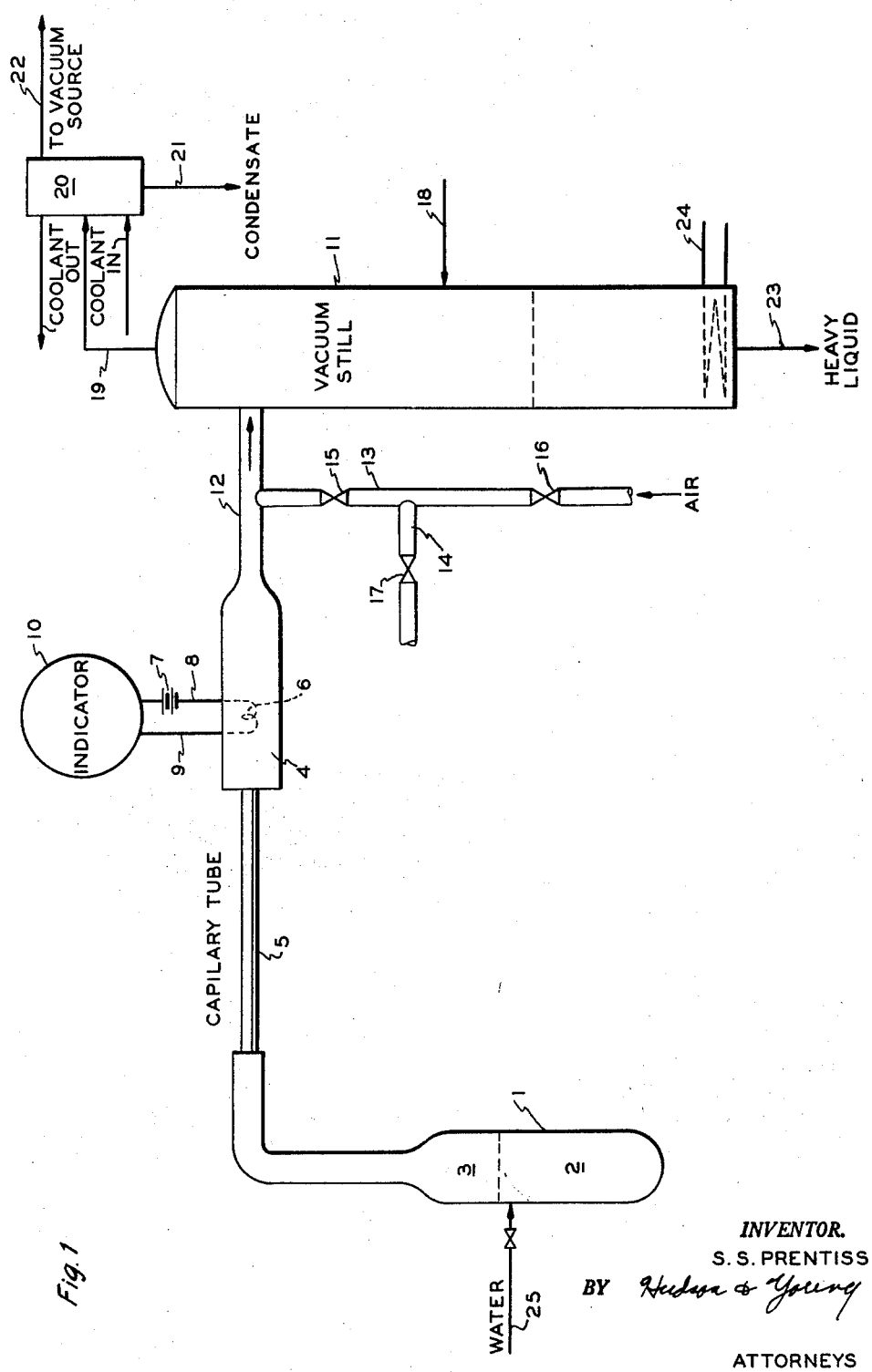
Figure 2:
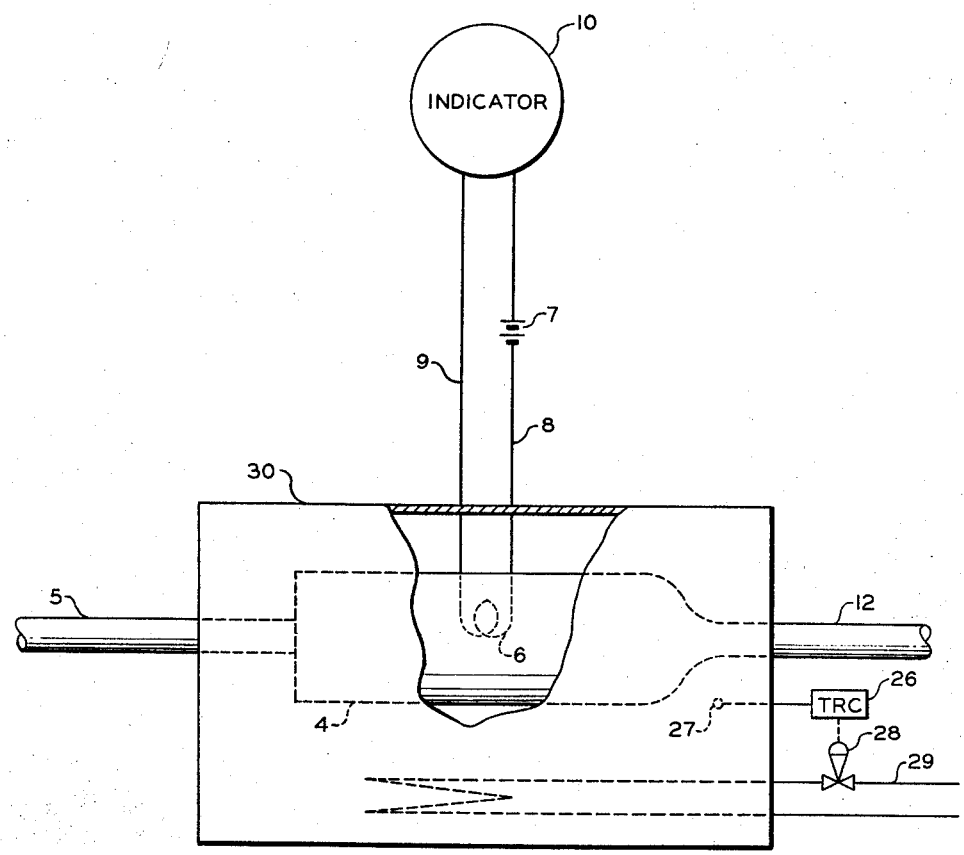

INVENTOR.
S. S. PRENTISS
BY Hudson + Young
ATTORNEYS

United States Patent Office 2,914,948
Patented Dec. 1, 1959

2,914,948

APPARATUS FOR MEASURING LOW PRESSURE

Spencer S. Prentiss, Bartlesville, Okla., assignor to Phillips Petroleum Company, a corporation of Delaware Application December 31, 1953, Serial No. 401,640

6 Claims. (Cl. 73—398)

This invention relates to an apparatus for measuring subatmospheric pressures in vacuum systems. In one of its aspects, this invention relates to an apparatus for measuring subatmospheric pressures in vacuum systems containing non-ideal gases such as hydrocarbons, water, or easily condensable vapor.

The accurate measurement of subatmospheric pressure has been accomplished by a variety of instruments based on different properties of gases at low pressures. Boyle's law, heat conductivity, ionization, and viscosity are some of the properties used in these instruments. In systems containing a non-ideal gas, or easily condensable or adsorbable vapor, such as water or hydrocarbons, the response with some of these methods of measurement is erratic or no response is obtained. In any case, the results appear to be questionable. New techniques must be developed or present methods must be modified in order to obtain reliable data for these systems.

It is known that water vapor in gas can readily be determined. One method of making such a determination is by measuring the resistance of an electrolyte placed in the gas. The resistance of the electrolyte will be inversely dependent upon the moisture concentration in the gas. For a full discussion of this method see the method of Elmer K. Weaver and Ralph Riley, Journ. of Res. Nat. Bur. of Std., 40, 169–214 (1948).

The electrolytic film method of determining small concentrations of water vapor utilizes the change in electrical resistance of an electrolytic film as it absorbs water vapor. The thin film of liquid, which may be phosphoric acid or other electrolytic compound, in a gelatin or other binding material, is spread over the surface of a solid insulator between the metallic electrodes. The electrolyte tends to reach equilibrium with the water vapor and surrounding gas and forms a solution, the electrical conductance of which is a measure of the concentration of water vapor in the system. An electrical circuit involving an adjustable bridge with its power supply and amplifying device along with an indicating device such as a galvanometer or microammeter is used to convert this electrical phenomena into vacuum pressure readings. Further discussion of the apparatus for the determining of water content is available in the above cited reference.

I have now discovered that subatmospheric pressure can be continuously determined in various evacuated systems by measuring the concentration of water vapor in a chamber in communication with the evacuated system. In the apparatus of my invention, a chamber (referred to as the detector chamber) of low fluid flow pressure drop and in full communication with the vacuum system being measured is purged with water vapor and the concentration or pressure of water in the chamber is determined by suitable apparatus. Since only water vapor is present in the chamber, a measure of the water content is also a measure of the pressure provided the temperature is sufficiently high to maintain the water vapor pressure above the pressure of the system, i.e. the temperature is maintained above the dew point of the water. The volume of the evacuated system must be large in comparison to the detector chamber and the flow of water vapor must be very small in order to avoid either increasing the pressure of the evacuated systems or increasing the pumping load necessary to maintain the established pressure. No liquid water should be present in the detector chamber.

An object of this invention is to provide an apparatus for measuring subatmospheric pressures in vacuum systems.

A further object of this invention is to provide an apparatus for continuously measuring subatmospheric pressures in vacuum systems containing non-ideal gases, water vapor, or easily condensable vapors.

Other objects and advantages of my apparatus will be apparent to those skilled in the art on reading this disclosure and the attached claims.

I will further describe my invention by referring to the attached schematic drawing of which Figure I shows an embodiment of my invention wherein the pressure is being determined in a vacuum distillation system and Figure II shows the detector chamber in a suitable constant temperature environment.

Referring to the drawing, a water reservoir 1 having a liquid zone 2 and a vapor zone 3 has its vapor zone 3 connected to a detector chamber 4 via capillary tube 5. A resistance element 6 which is sensitive to moisture (referred to as a detector element) is placed within the detector chamber. A current from source 7 is passed through the resistance element to indicator 10 via conduits 8 and 9. The indication can be calibrated to read pressure directly. The detector chamber 4 is connected in free communication with vacuum still 11 via conduit 12.

Since the resistance due to water concentration of commercially available detector elements is subject to change with use, a means is provided to check the calibration of the instrument from time to time. A Mcleod or similar gage (not shown), is attached to conduit 13 via conduit 14. Conduit 13 is connected through valve 15 to conduit 12. Air bleed valve 16 is provided to flush conduit 13 prior to a calibration check. It is pointed out that the Mcleod gage does not give satisfactory results where condensable vapors are present and for that reason is not satisfactory as a measuring device in those systems with non-ideal or condensable vapors. Valve 15 is closed during the normal use of my invention. When it is desirable to check the reference point of my apparatus, valves 15 and 16 are opened and a sufficient amount of air is admitted to conduit 13 via bleed valve 16 to flush conduit 13 free of condensable vapors. Valve 16 is closed and valve 17 in conduit 14 is opened to the Mcleod gage. A simultaneous reading is taken on the Mcleod gage and indicator 10. Any calibration correction is noted and valve 15 is closed.

Material to be distilled is admitted to the vacuum still 11 via conduit 18. Vapor is taken overhead via conduit 19 to condenser 20 where the condensable vapors are condensed and subsequently removed via conduit 21. Means for reflux can be provided if desired. The condenser is connected to a vacuum source such as steam ejectors via conduit 22. The bottoms product from the distillation is removed from the still via conduit 23. Heat for evaporation is supplied by means of heater 24.

In the operation of my invention, water is admitted to zone 2 of reservoir 1 via conduit 25. A vacuum is pulled on still 11. Zone 3 of the reservoir is filled with water vapor and the difference in pressure due to the vapor pressure in zone 3 and the vacuum in detector chamber 4 causes the water vapor to be pulled through capillary tube 5. This water vapor sweeps the other gases out of detector chamber 4 and the concentration of water vapor remaining in chamber 4 will be dependent upon the pressure. A current potential from source 7 is applied to the detector element 6 and the amount of current flowing will be dependent upon the concentration of water vapor in the chamber. The indicator 10 is responsive to the flow of current through the element 6 and is calibrated to indicate the pressure.

The flow of water vapor to chamber 4 should be small in order that the vacuum system will not be overloaded and also to prevent flooding of the detector chamber thereby creating too high a concentration of vapor in said chamber. The chamber should be small in comparison to the vacuum system to insure the complete flushing of the chamber with water vapor.

A capillary having an inside diameter of 0.039 cm. and 19.8 cm. in length passed 7.2 milligrams of vapor per minute when the reservoir was at 23° C. (20–21 mm. of Hg vapor pressure) and the vacuum system had a pressure of 2 mm. of Hg. This would require less than 0.55 liter of distilled water per month of continuous operation.

For the concentration of the water vapor to be a measure of the pressure, the vapor pressure of the water must be greater than the pressure being measured. Therefore, if the pressure and temperature conditions are such that the vapor pressure of water is less than the pressure being measured then detector chamber 4 would have to be heated in order to raise the water vapor pressure. This can readily be done by placing the detector chamber in a constant temperature chamber such as 30. This chamber is kept at constant temperature by means of heat source 29 which is operably connected via control valve 28 and temperature recorder controller 26 to thermocouple 27 which is placed within chamber 30. The temperature recorder controller is preset at the desired temperature and controls the heat from source 29 via regulator 28 in response to changes in temperature as detected by thermocouple 27 so as to maintain the temperature of said chamber substantially constant.

It is also necessary for the operation of my invention that the vapor pressure in the reservoir be greater than the pressure being measured otherwise there would be no flow through the capillary tube. If the pressure being measured is greater than the vapor pressure of water at room temperature, it is necessary to heat the reservoir in order to increase the vapor pressure in zone 3. It is also desirable to control the temperature of the reservoir in order to better control the flow of vapor through the capillary, i.e. maintain a uniform pressure drop. However, if the temperature variations are not great, there is little chance of overloading the vacuum system and the control of the reservoir temperature is not necessary. The temperature of the reservoir should not be greater than the temperature of the detector chamber, otherwise, there is danger of condensation in the capillary tube which would cause gushes of liquid into the detector chamber.

My invention is operable for measuring pressures below atmospheric. However from a practical limitation, there are many practical and suitable means for measuring pressure above 30 mm. of mercury (Hg). It is also inconvenient to maintain the temperature of the reservoir above about 100° F. or a vapor pressure of 50 mm. of Hg. For that reason, a preferred upper limit for my method and apparatus will be 50 mm. of Hg and more preferably 30 mm. of Hg. The detector elements give erratic readings at very low moisture levels. For that reason, measurements of pressures below 0.1 mm. of Hg are erratic. On the other hand, I have obtained excellent results at pressures down to 0.3 mm. of Hg. This lower limitation is not a limitation on the method, but is a limitation on available detecting elements. For this reason I prefer to use my method and apparatus for measuring pressures from 0.1 mm. to 50 mm. of Hg and more preferably for pressures between 0.3 mm. and 30 mm. of Hg.

I have illustrated my invention in a vacuum distillation system. However, my invention is applicable for measuring subatmospheric pressures in any vacuum system and has particular value for measuring pressures in vacuum systems containing a non-ideal gas or condensable vapors. Those skilled in the art will see many applications and modifications for this invention which can be utilized without departing from the scope thereof.

I claim:

1. An apparatus for measuring subatmospheric pressure in a vacuum apparatus, the first said apparatus comprising in combination a reservoir containing liquid water in a lower zone and water vapor in an upper zone; a detector chamber disposed in the fluid flow path between said reservoir and said vacuum apparatus and connected in free communication to the subatmospheric pressure chamber of said vacuum apparatus; means for continuously admitting vapor from the vapor zone of said reservoir through said detector chamber to said vacuum apparatus so that water above its dew point is continuously swept through said detector chamber; means disposed in said detector chamber for detecting the concentration of water vapor and indicating means responsive to and operably connected to said detecting means.

2. An apparatus for measuring subatmospheric pressure in a vacuum apparatus, the first said apparatus comprising in combination a reservoir containing liquid water in a lower zone and water vapor at a higher pressure than the pressure of the vacuum apparatus in an upper zone; a detector chamber disposed in the fluid flow path between said upper zone of said reservoir and said vacuum apparatus and connected in free communication with the subatmospheric zone of said vacuum apparatus; means for continuously admitting vapor from said vapor zone of said reservoir to said detector chamber so that said vapors are continuously swept through said detector chamber to said vacuum apparatus; means for maintaining the temperature in said detector chamber sufficiently high that the vapor pressure of water of the said detector chamber is maintained higher than that of the subatmospheric pressure of the vacuum apparatus; means for detecting the concentration of water vapor, said means being disposed in said detector chamber; and indicating means responsive to and operably connected to said detecting means.

3. An apparatus for measuring subatmospheric pressures in a vacuum system, said apparatus comprising in combination a reservoir containing liquid water in a lower zone and water vapor in an upper zone and at a higher pressure than the pressure to be measured; a detector chamber adapted to be connected in free communication with said vacuum system and disposed in the fluid flow path between said upper zone and the subatmospheric pressure in said vacuum system to be measured; means for continuously admitting vapor from the water vapor zone of said reservoir to said detector chamber and at a rate to maintain said detector chamber full of water vapor; means for maintaining the water in vapor state in said detector chamber; a detector element having a resistance inversely related to the water vapor concentration disposed within said detector chamber and in said fluid flow path; a current potential operably connected to said detector element, and an indicating means responsive to current flow operably connected to said detector element.

4. The apparatus of claim 3 wherein the subatmospheric pressure is in the range of 0.1 millimeter to 50 millimeters of mercury.

5. The apparatus of claim 3 wherein the subatmospheric pressure is in the range of 0.3 millimeter to 30 millimeters of mercury.

6. The apparatus of claim 3 wherein the means for admitting vapor from the water vapor zone of the reservoir to the detector chamber is a capillary tube.

References Cited in the file of this patent

UNITED STATES PATENTS

| | | |
|---|---|---|
| 1,855,774 | Schneider | Apr. 26, 1932 |
| 2,651,942 | Minter | Sept. 15, 1953 |

FOREIGN PATENTS

| | | |
|---|---|---|
| 842,858 | Germany | July 3, 1952 |

OTHER REFERENCES

MIT "Research Reports on Quartermaster Contract Projects," etc. (Pub. of the Office of the Quartermaster General, Military Planning Div., Research and Development Branch, Army Service Forces), received March 6, 1950, U.S. Patent Office, pp. 22–27 inclusive, 136 and 137, relied on.